Figure 1:
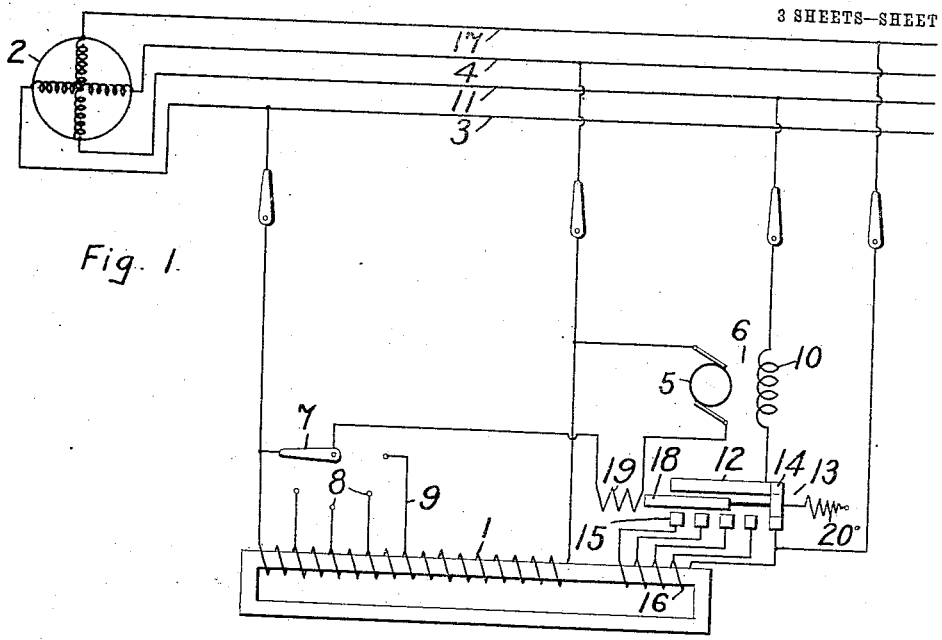

No. 839,958. PATENTED JAN. 1, 1907.
C. RENSHAW.
REGULATOR FOR ALTERNATING CURRENT MOTORS.
APPLICATION FILED FEB. 6, 1905.

3 SHEETS—SHEET 1.

WITNESSES:
Fred H. Miller
Otto S. Schairer

INVENTOR
Clarence Renshaw
BY
Wesley J. Carr
ATTORNEY

No. 839,958. PATENTED JAN. 1, 1907.
C. RENSHAW.
REGULATOR FOR ALTERNATING CURRENT MOTORS.
APPLICATION FILED FEB. 6, 1905.
3 SHEETS—SHEET 2.
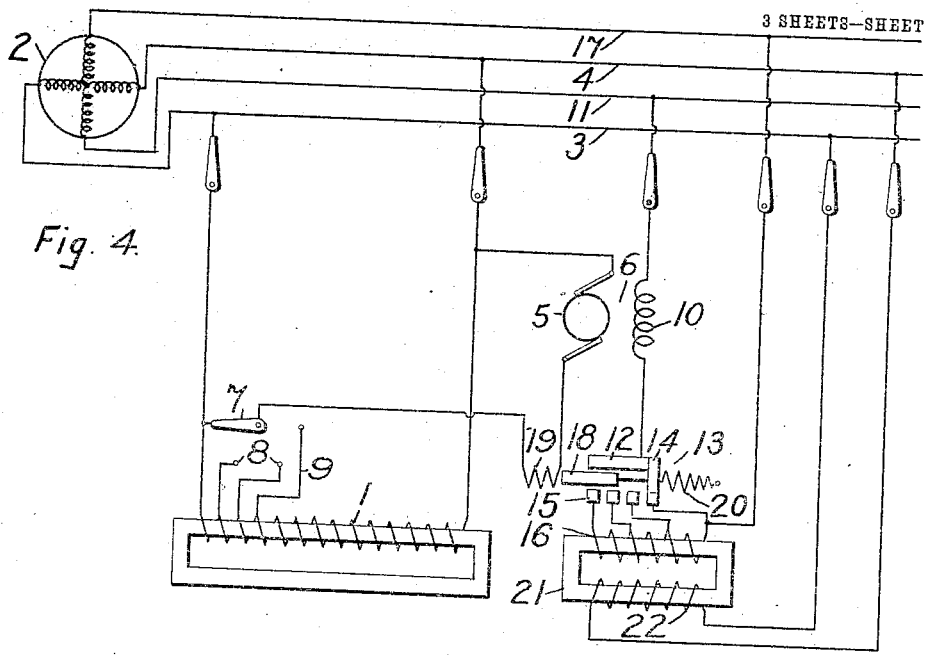
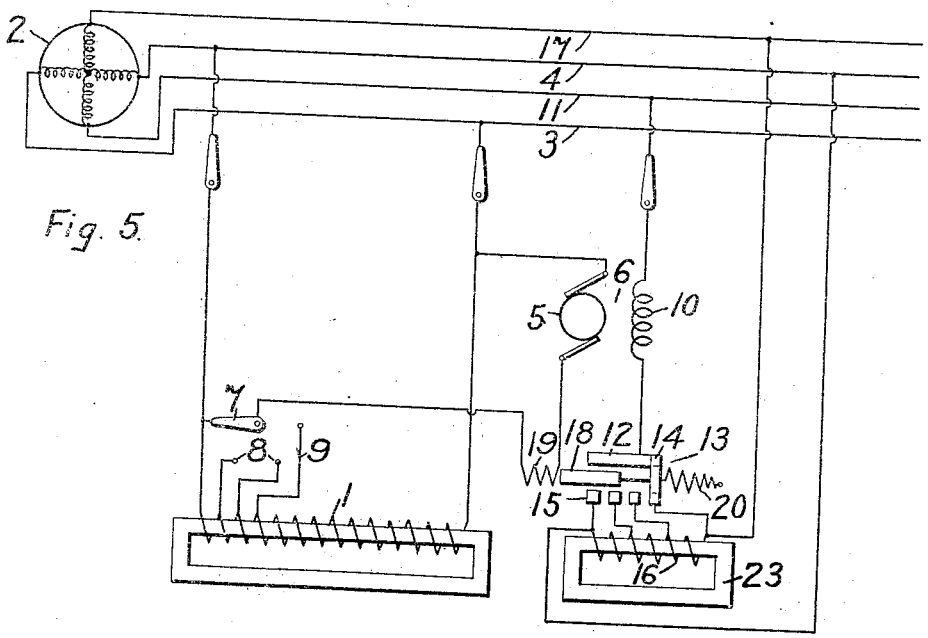
WITNESSES:
Fred. H. Miller
Otto S. Schairer
INVENTOR
Clarence Renshaw
BY
Wesley G. Carr
ATTORNEY No. 839,958. PATENTED JAN. 1, 1907.
C. RENSHAW.
REGULATOR FOR ALTERNATING CURRENT MOTORS.
APPLICATION FILED FEB. 6, 1905.

3 SHEETS—SHEET 3.

WITNESSES:
Fred. H. Miller
Otto S. Schaurer

INVENTOR
Clarence Renshaw
BY
ATTORNEY

UNITED STATES PATENT OFFICE.

CLARENCE RENSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR FOR ALTERNATING-CURRENT MOTORS.

No. 839,958.   Specification of Letters Patent.   Patented Jan. 1, 1907.

Application filed February 6, 1905. Serial No. 244,481.

*To all whom it may concern:*

Be it known that I, CLARENCE RENSHAW, a citizen of the United States, and a resident of Wilkinsburg, in the county of Allegheny and State of Pennsylvania, have invented a new and useful Improvement in Regulators for Alternating-Current Motors, of which the following is a specification.

My invention relates to alternating-current motors of the commutator type of construction; and its object is to provide improved means for supplying energy to such motors from multiphase sources, whereby the proper phase relations of the currents traversing the armature and field-magnet windings for the most efficient and economical operation may be secured.

In general motors of the commutator type of construction if properly designed may be operated efficiently by means of alternating currents, provided the currents in the armature and field-magnet windings reverse simultaneously, or nearly so. If the armature-winding and the field-magnet winding of a motor of the commutator type having laminated magnetic circuits are supplied, respectively, with alternating electromotive forces differing ninety degrees in phase, the currents in the armature and field-magnet windings may reverse nearly simultaneously. This is true, because the current traversing the field-magnet winding may be largely a magnetizing or wattless current which lags nearly ninety degrees behind the electromotive force impressed upon that circuit, while the armature-circuit may be and is ordinarily made with but little self-induction, so that the current in the circuit lags but little behind the electromotive force impressed upon it. It is obvious, then, that if the electromotive forces applied to the two circuits differ ninety degrees in phase the currents in the armature and field-magnet circuits may differ but little in phase. It has been found in practice, however, that in order to obtain minimum armature-current for a given torque it is necessary that the currents in the armature and field circuits be more nearly coincident in phase than is the case if only the differences of the power factors of the circuits are depended upon to produce the proper relations. The insufficiency of the power-factor conditions of the circuits is partially due to the fact that the armature-circuit cannot be made entirely non-inductive. Moreover, when constant voltages are applied to the armature and field-magnet windings the amount of current in the field-magnet winding, as well as its phase relation with respect to the electromotive force applied to the winding, remains practically constant even under variations in the load upon the motor, but the amount of current in the armature-circuit varies according to the work which the motor is doing, and the phase relations of this current with respect to the electromotive force applied to the armature-winding varies as the amount of current varies. Thus the phase relations of the currents in the armature and field-magnet windings with respect to each other vary as the work done by the motor varies. With no load on the motor—*i. e.*, with but small currents flowing in the armature-circuit—the phase relations may be reasonably close to what is desired; but as load is placed on the motor the phase relations with respect to each other of the armature and field currents change.

It is the purpose of this invention to provide means for effecting the proper adjustment of the phase relations of the armature and field currents in order to obtain minimum armature-current for a given torque regardless of the load upon the motor. This may be done according to two methods—viz., by varying the phase relation of the electromotive force applied to one circuit with respect to that applied to the other in accordance with changes in load or by altering the phase relation of the current to the electromotive force in the armature-winding or in the field-magnet winding, or in both. Only the first of these methods is practiced by my invention.

Other means and a method for effecting adjustment of the phase relations of the currents in the armature and field-magnet windings are described in an application Serial No. 244,482, filed jointly by Benjamin G. Lamme and myself, and in applications Serial Nos. 244,475, 244,476, and 244,477, filed by Benjamin G. Lamme, all of even date herewith.

My invention is illustrated in the accompanying drawings, in which—

Figure 2:
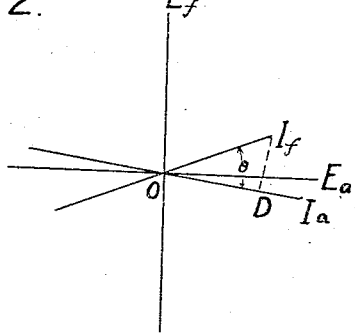
Figure 3:
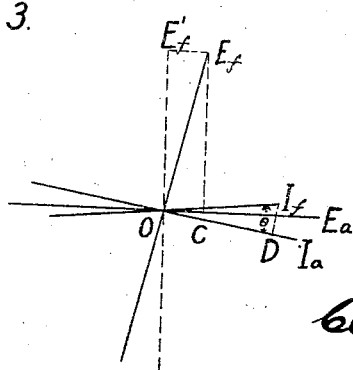
Figure 6:
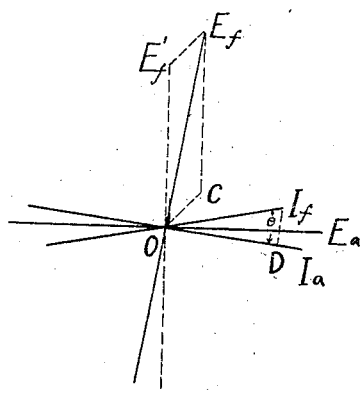
Figure 7:
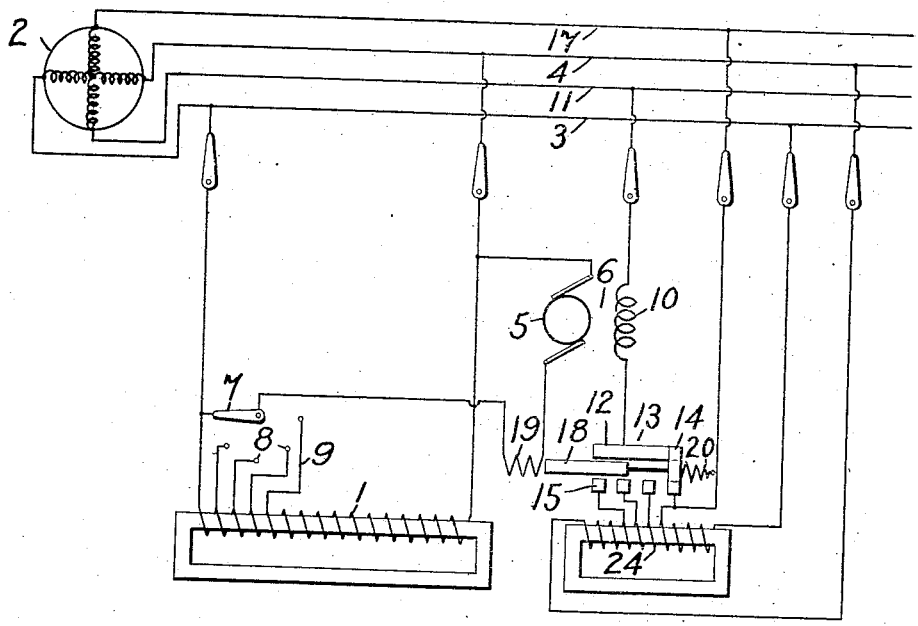

Figure 1 illustrates diagrammatically a two-phase source of energy and a motor supplied therefrom that is provided with a specific type of phase-adjusting means. Figs. 2 and 3 are vector diagrams illustrative of the approximate phase relations of the currents and electromotive forces of the motor shown in Fig. 1. Figs. 4, 5, and 7 are diagrammatic views illustrating modifications of my invention, and Fig. 6 is a vector diagram of the approximate phase relations as they occur in the modification of Fig. 5.

In Fig. 1 a transformer-winding 1 is supplied with energy from a suitable two-phase generator 2, having a closed-coil armature-winding, by means of conductors 3 and 4. Armature 5 of motor 6 derives its energy from the transformer-winding 1, a suitable means for varying the electromotive force applied to the armature-winding comprising a pivoted arm 7, adapted to engage contact-terminals 8, which are connected to spaced points in the transformer-winding 1 by means of leads 9.

One terminal of the field-magnet winding 10 of the motor 6 is connected to supply-conductor 11, and the other terminal is connected to a suitable conducting-strip 12 of a regulating device 13. A brush 14 is adapted to make sliding contact with the conducting-strip 12 and to engage contact-terminals 15, which are connected to suitably-spaced points in a winding 16, which is placed in the same magnetic circuit as the transformer-winding 1 and one terminal of which is connected to supply-conductor 17. The brush 14 is carried by the core 18 of solenoid 19, which is connected in series with the motor-armature 5. A spring 20 is attached to the brush 14 in any suitable manner for the purpose of resisting the pull exerted by the solenoid 19. If the current in the armature-circuit increases the brush 14 is moved so as to cut into the field-circuit more of the winding 16, and if the current in the armature-circuit decreases, the spring 20 causes part of the winding 16 to be cut out of the field-circuit. It is of course understood that the controlling device 13 is only illustrative of any suitable means for varying the length of the winding 16, included in the field-circuit, substantially in accordance with variations in the amount of current in the armature-circuit, and that other devices for effecting this result may be employed which will be within the scope of my invention.

An understanding of the approximate phase relations of the currents and electromotive forces in the armature and field-magnet windings under the different conditions may be obtained from a consideration of Figs. 2 and 3. In Fig. 2 I have shown the approximate phase relations as they would occur in the motor if no auxiliary devices were employed for altering them. Lines $OE_a$ and $OE_f$ represent, respectively, the electromotive forces applied to the armature and field-magnet windings, and lines $OI_a$ and $OI_f$ represent in direction the currents in the armature and field-magnet windings. The angle $\theta$ represents the phase difference between the currents in the armature and in the field-magnet windings. It will be observed that in Fig. 3 the phase of the electromotive force $OE_f$ is indicated as shifted from the relation shown in Fig. 2 with respect to the electromotive force $OE_a$, since when a part or the whole of the transformer-winding 16 is included in the field-circuit the electromotive force $OE_f$, which is applied to the field-magnet winding, is the resultant of the electromotive force $OE'_f$, that is derived from the supply-circuit, and the electromotive force $OC$, that is derived from the winding 16, the electromotive force $OC$ being in phase with the electromotive force $OE_a$. The angle $E_f OI_f$ is determined by the power factor of the field-circuit and remains the same in both cases. As above noted, the angle $E_f OE_a$ in Fig. 3 is less than the corresponding angle in Fig. 2, and hence the angle $\theta$ in Fig. 3 is less than the angle $\theta$ in Fig. 2. The field magnetism being proportional to and in phase with the field-current, the line $OI_f$ may represent the phase direction of the field magnetism as well as that of the field-current.

The torque exerted by the armature of such a motor as is hereinbefore described is proportional to the product of the armature-current $OI_a$ and the component $OD$ of the field magnetism which is in phase with the armature-current. It is obvious that when the angle $\theta$ is a minimum the component $OD$ is a maximum, and when the component $OD$ is a maximum—i. e., when the field and armature currents are most nearly in phase—the power factor of the motor is a maximum and the armature-current a minimum for that particular torque.

It will be understood that the electromotive force represented by the line $OC$ may be chosen of such magnitude that the resultant electromotive force $OE_f$ and the corresponding current $OI_f$ may be shifted to bring the field-magnet current $OI_f$ and the armature-current $OI_a$ into phase with each other.—i. e. so that the lines $OI_f$ and $OI_a$ will coincide in direction. While this is a desirable condition for operation and, as just stated, may be attained if the component forces are properly chosen, I have indicated relations that only approximate this condition, for the reason that such approximation may be more conveniently and clearly illustrated.

By proper adjustment of the regulating device 13 it may be caused to operate so as to maintain the phase relations of the currents in the armature and field circuits approximately constant, regardless of variations in the amount of load, with given voltages applied to the motor-windings.

Various modifications of my invention, such as are shown in Figs. 4, 5, and 7, may be found of use in special cases, though in general not so economical in construction. In Fig. 4 the winding 16 is the secondary winding of a separate transformer 21 from that which supplies energy to the armature-winding the primary winding 22 of which is connected between the same supply-conductors 3 and 4 as the transformer-winding 1. The approximate phase relations of the currents and electromotive forces in the armature and field-magnet windings of Fig. 4 are shown in Fig. 3.

In Fig. 5 the winding 16 of an autotransformer 23 is connected between supply-conductors 4 and 17 the currents of which differ in phase. The approximate phase relations are shown in Fig. 6, in which the electromotive force $OE_t$ impressed upon the field-magnet winding is the resultant of the electromotive force $OE'_t$, applied to the field-circuit and the electromotive force $OC$ derived from the winding 16. An autotransformer-winding 24 may also be connected between the same supply-conductors 3 and 4 as is the main transformer-winding 1, and the points of connection of the field-magnet winding therewith may be shifted in accordance with variations in the amount of current traversing the armature-circuit, substantially as shown in Fig. 7.

While I have shown and described my invention as employed only for the purpose of altering the phase of the current in the field-magnet winding with respect to that of the current in the armature-winding, it is of course understood that if it is desired so to do the phase of the current in the armature-winding with respect to that of the current in the field-magnet winding may be adjusted in accordance with the same method and to meet the same or any other desired conditions.

I claim as my invention—

1. The combination with a source of two-phase alternating-current energy, a transformer connected to one phase of said source, an electric motor the armature of which is supplied by said transformer, means for connecting the field-magnet winding to the other phase of said source, and a winding connected in series with the field-magnet winding and located in the magnetic circuit of the transformer.

2. The combination of a source of two-phase alternating-current energy, a transformer connected to one phase of said source, an electric motor the armature of which is supplied by said transformer, means for connecting the field-magnet winding to the other phase of said source, a winding connected in series with the field-magnet winding and located in the magnetic circuit of the transformer, and means for varying the active length of said winding.

3. The combination of a source of two-phase alternating-current energy, a transformer connected to one phase of said source, an electric motor the armature of which is supplied by said transformer, means for connecting the field-magnet winding to the other phase of said source, a winding connected in series with the field-magnet winding and located in the magnetic circuit of the transformer, and means for varying the active length of said winding substantially in accordance with variations in the current traversing the armature-circuit.

4. The combination of a source of two-phase alternating-current energy, a transformer connected to one phase of said source, an electric motor the armature of which is supplied by the transformer, means for connecting the field-magnet winding to the other phase of said source, a winding connected in series with the field-magnet winding and located in the magnetic circuit of the transformer, and means for varying the active length of said winding comprising a controlling device responsive in its operation to variations in the current traversing the armature-circuit.

5. The combination of a source of two-phase alternating-current energy, a transformer-winding supplied from one phase of said source, an electric motor having armature and field-magnet windings, means for connecting the armature-winding to points in the transformer-winding, means for connecting the field-magnet winding to the other phase of said source, and a transformer-winding that is connected in series with the field-magnet winding and upon which is impressed an electromotive force of a different phase from that impressed upon the field-magnet winding.

6. The combination of a source of two-phase alternating-current energy, a transformer-winding supplied from one phase of said source, an electric motor having armature and field-magnet windings, means for connecting the armature-winding to points in the transformer-winding, means for connecting the field-magnet winding to the other phase of said source, a transformer-winding that is connected in series with the field-magnet winding and upon which is impressed an electromotive force of a different phase from that impressed upon the field-magnet winding, and means for varying the active length of said winding.

7. The combination of a source of two-phase alternating-current energy, a transformer-winding supplied from one phase of said source, an electric motor having armature and field-magnet windings, means for connecting the armature-winding to points in the transformer-winding, means for connecting the field-magnet winding to the other phase of said source, a transformer-winding that is connected in series with the field-magnet winding and upon which is impressed an electromotive force of different phase from that impressed upon the field-magnet winding, and means for varying the active length of said winding substantially in accordance with variations in the amount of current traversing the armature-circuit.

8. The combination of a source of two-phase alternating-current energy, a transformer-winding supplied from one phase of said source, an electric motor having armature and field-magnet windings, means for connecting the terminals of the armature-winding to points in the transformer-winding, means for connecting the field-magnet winding to the other phase of said source, a transformer-winding that is connected in series with the field-magnet winding and upon which is impressed an electromotive force of different phase from that impressed upon the field-magnet winding, and means for varying the active length of said winding comprising a controlling device responsive in its operation to variations in the amount of current traversing the armature-circuit.

9. The combination with a source of two-phase alternating-current energy and a transformer supplied from one phase of said source, of an electric motor the armature-terminals of which are connected to said transformer, means for changing the said connections to vary the voltage applied to the armature-windings, means for connecting the field-magnet winding to the other phase of said source, and a transformer-winding that is connected in series with the field-magnet winding and upon which is impressed an electromotive force of a different phase from that impressed upon the field-magnet winding.

10. The combination with a source of two-phase alternating-current energy and a transformer supplied from one phase of said source, of an electric motor the armature-terminals of which are connected to said transformer, means for changing the said connections to vary the voltage applied to the armature-winding, means for connecting the field-magnet winding to the other phase of said source, a transformer-winding that is connected in series with the field-magnet winding and upon which is impressed an electromotive force of a different phase from that impressed upon the field-magnet winding, and means for varying the active length of said winding.

11. The combination with a source of alternating-current energy and a transformer supplied from one phase of said source, of an electric motor the armature-terminals of which are connected to said transformer, means for applying an electromotive force of another phase to the field-magnet winding, and a transformer-winding that is connected in series with the field-magnet winding and is located in inductive relation to the main transformer-windings.

12. The combination with a source of alternating-current energy and a transformer supplied from one phase of said source, of an electric motor the armature-terminals of which are connected to said transformer, means for applying an electromotive force of another phase to the field-magnet winding, and a transformer-winding that is connected in series with the field-magnet winding and is located upon the same magnetizable core as the main transformer-windings.

13. The combination with a source of alternating-current energy and a transformer supplied from one phase of said source, of an electric motor the armature-terminals of which are connected to said transformer, means for applying an electromotive force of another phase to the field-magnet winding, a transformer-winding that is connected in series with the field-magnet winding and is located in inductive relation to the main transformer-windings, and means for varying the active length of said winding.

14. The combination with a source of alternating-current energy and a transformer supplied from one phase of said source, of an electric motor the armature-terminals of which are connected to said transformer, means for applying an electromotive force of another phase to the field-magnet winding, a transformer-winding that is connected in series with the field-magnet winding and is located in inductive relation to the main transformer-windings, and means for varying the electromotive force impressed upon the field-circuit by the said winding.

15. The combination with a source of alternating-current energy and a transformer supplied from one phase of said source, of an electric motor the armature-terminals of which are connected to said transformer, means for applying an electromotive force of another phase to the field-magnet winding, a transformer-winding that is connected in series with the field-magnet winding and is located in inductive relation to the main transformer-windings, and means for varying the electromotive force impressed upon the field-circuit by said winding substantially in accordance with variations in the amount of current traversing the armature-circuit.

16. The combination with a source of alternating-current energy and a motor the armature and field circuits of which are supplied with electromotive forces differing in phase, of a transformer-winding that is located in one of the motor-circuits and upon which is impressed an electromotive force of a different phase from the main electromotive force impressed upon that circuit, and means for varying the active length of said winding substantially in accordance with the variations in the amount of current traversing the armature-circuit.

17. The combination with a source of alternating-current energy, a transformer supplied from one phase of said source and a motor having armature and field-magnet windings, of means for connecting one of the motor-windings to the transformer-winding and the other motor-winding to another phase of said source, and a transformer-winding that is connected in series with one of the motor-windings and upon which is impressed an electromotive force of a different phase from the main electromotive force impressed upon that winding, and means for varying the active length of said winding substantially in accordance with the variations in the amount of current traversing the armature-circuit.

In testimony whereof I have hereunto subscribed my name this 3d day of February, 1905.

CLARENCE RENSHAW.

Witnesses:
 OTTO S. SCHAIRER,
 BIRNEY HINES.